United States Patent
Kurth

(10) Patent No.: US 6,321,781 B1
(45) Date of Patent: Nov. 27, 2001

(54) APPARATUS FOR MONITORING THE VALVE STROKE OF AN ELECTROMAGNETICALLY ACTUATED VALVE

(75) Inventor: Guido Kurth, Meerbusch (DE)

(73) Assignee: Pierburg AG, Neuss (DE)

( * ) Notice: Subject to any disclaimer, the term of this patent is extended or adjusted under 35 U.S.C. 154(b) by 0 days.

(21) Appl. No.: 09/533,914

(22) Filed: Mar. 23, 2000

(30) Foreign Application Priority Data

Mar. 30, 1999 (DE) .............................................. 199 14 372

(51) Int. Cl.[7] .................................................. F16K 37/00
(52) U.S. Cl. ...................................... 137/554; 251/129.15
(58) Field of Search ........................ 137/554; 251/129.15

(56) References Cited

U.S. PATENT DOCUMENTS 3,859,619 * 1/1975 Ishihara et al. ...................... 137/554
5,032,812 * 7/1991 Banick et al. .......................... 335/17
5,257,014 * 10/1993 Zimmermann ...................... 340/686

* cited by examiner

*Primary Examiner*—A. Michael Chambers
(74) *Attorney, Agent, or Firm*—Ladas & Parry

(57) ABSTRACT

Apparatus for determining whether an electromagnetic valve is operating properly wherein an armature of the valve carries an annular magnet facing a Hall-effect sensor switch which is exposed to the magnetic field of the magnet when the armature is in a home position. If the armature is not shifted from its home position when the valve is energized, this malfunction of the valve is detected by an evaluation unit connected in series to the output of the Hall-effect sensor switch. Below the Hall-effect sensor switch a short circuit ring is attached, at a well defined stroke position relative to the magnet, in order to ensure that the magnetic field of the magnet does not influence the working capability of the valve during proper operation. The output of the evaluation unit can be connected to a visual display device.

4 Claims, 2 Drawing Sheets

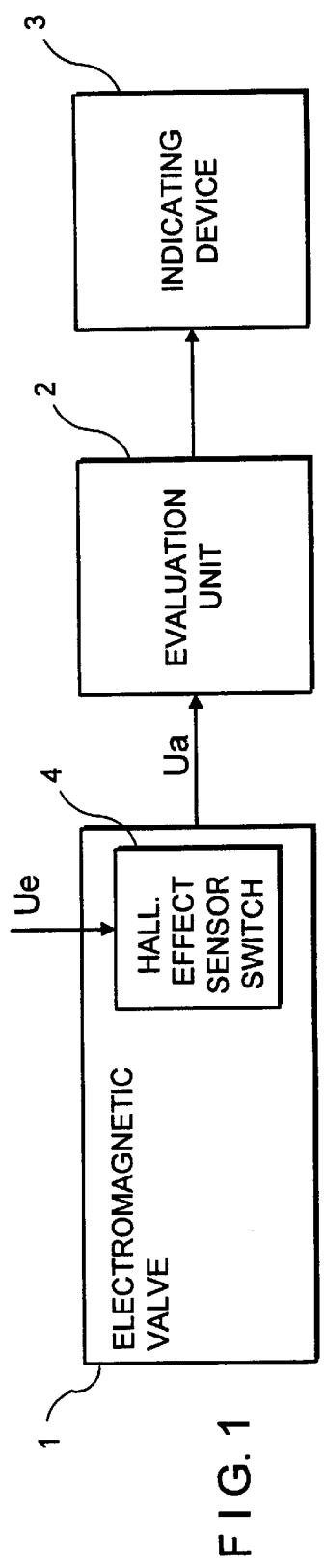
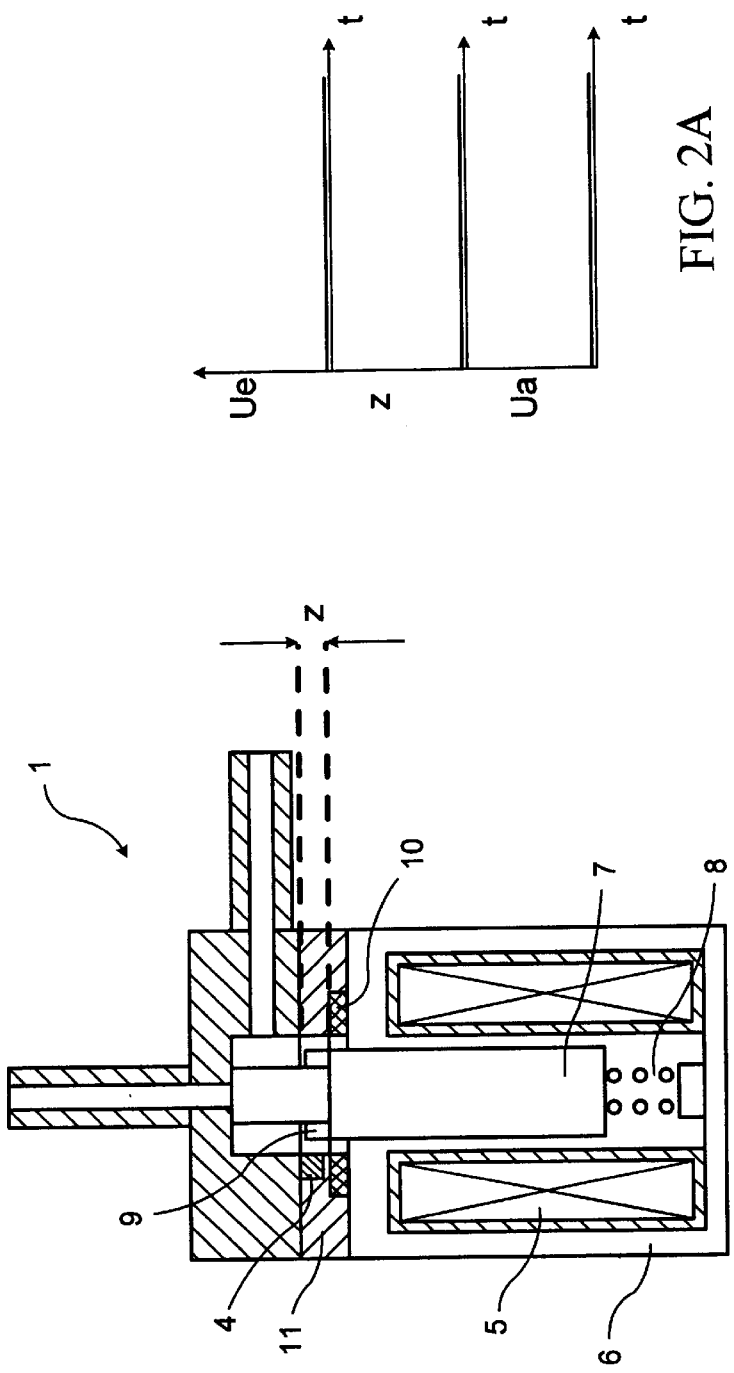
FIG. 1
FIG. 2
FIG. 2A

APPARATUS FOR MONITORING THE VALVE STROKE OF AN ELECTROMAGNETICALLY ACTUATED VALVE

FIELD OF THE INVENTION

The invention relates to apparatus for monitoring the valve stroke of an electromagnetically actuated valve in which a valve member is displaced by an electromagnet and an opposition spring.

BACKGROUND AND PRIOR ART

Electromagnetically activated valves, such as solenoid or electropneumatic changeover valves, are used in changeover, disconnection or vent devices, and are employed, for example, in activated-charcoal filter systems of internal combustion engines of motor vehicles or in combination with pneumatic actuators.

As known, an electromagnetically actuated changeover valve comprises a coil, an armature and a restoring spring. In the energized state, the armature is attracted by the magnetic force of the coil against the force of the restoring spring, thus opening or closing a valve inlet or outlet of the changeover valve. Such an electromagnetically actuated changeover valve is disclosed, for example, in German Patent Application DE 19733577 A.1.

A disadvantage of this type of valve, however, is that an autonomous functional check is not provided, of whether the armature actually opens or closes the inlet or outlet when it is in the energized state.

SUMMARY OF THE INVENTION

An object of the invention is therefore to provide an electromagnetically actuated valve in which an autonomous functional check is effected by means of the completed valve stroke.

In accordance with the invention, an autonomous functional check of the valve is obtained by feedback of its operating position to an evaluation unit. The feedback of the operating position is advantageously achieved by the use of a Hall-effect sensor switch, by means of which there is obtained a signal indicating whether or not armature attraction has occurred. Preferably, an annular magnet is disposed on the top of the armature and is arranged in facing relation with the Hall-effect sensor. Below the Hall-effect sensor there is attached a short-circuiting ring in a well-defined stroke position relative to the annular magnet.

The Hall-effect sensor can be supplied with the supply voltage of the coil, thus obviating the need for an additional external voltage source. An indicating device is connected to the output of the evaluation unit for visual display of the functional check.

BRIEF DESCRIPTION OF THE DRAWING

FIG. 1 is a block diagram of the circuitry of the electromagnetic valve of the invention.

FIG. 2 is a diagrammatic illustration of the valve according to the invention in a deenergized state.

FIG. 2a is a graphical illustration of signal values in the valve of FIG. 2.

DETAILED DESCRIPTION

FIG. 1 is a block diagram of the electrical circuit for the functional check of an electromagnetically actuated valve 1 and includes an evaluation unit 2 and an indicating device 3. The electromagnetically actuated valve 1 is a solenoid changeover valve, the evaluation unit 2 a comparator and the indicating device 3 a display such as a control lamp. A Hall-effect sensor switch 4 is disposed in solenoid changeover valve 1 and is electrically connected to the input of evaluation unit 2 and to supply voltage Ue.

Figure 3:
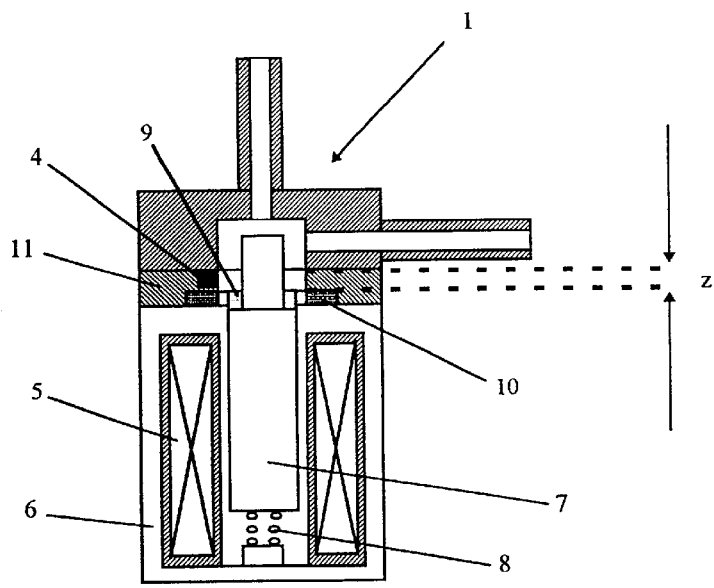
FIG. 3 shows the valve according to the invention in an energized state.

Referring to FIG. 2 which diagrammatically illustrates the valve 1 in deenergized state and FIG. 3 showing the valve in energized state, only those components necessary for understanding the invention will be described. Therein there is shown a coil 5, a yoke 6 with a casing 11, an armature 7 and a restoring spring 8. On armature 7 there is attached an annular, radially magnetized magnet 9 which is operatively coupled with Hall-effect sensor switch 4 in the deenergized position in FIG. 2. The Hall-effect sensor switch 4 is installed in yoke casing 11 of the solenoid changeover valve 1. Below the Hall-effect sensor switch 4 there is preferably disposed a magnetically conductive short-circuiting ring 10. The Hall-effect sensor switch 4 is preferably connected to supply voltage Ue, together with coil 5 (not illustrated in more detail).

In the deenergized position, when no supply voltage Ue is present at coil 5, and thus no current flows through coil 5, armature 7 remains in a home position, and the Hall-effect sensor switch 4 is exposed to the magnetic field of magnet 9. At the output of the opened Hall-effect sensor switch 4 there is present an output voltage Ua close to 0 volts. This voltage is simultaneously present at the input of evaluation unit 2, which by comparison of supply voltage Ue and output voltage Ua defines the operating condition of changeover valve 1. By internal programming, the "deenergized" operating state is characterized by definition as a supply voltage Ue close to 0 volts and a measured output voltage Ua close to 0 volts. Such a signal profile is shown in FIG. 2a.

Figure 3A:
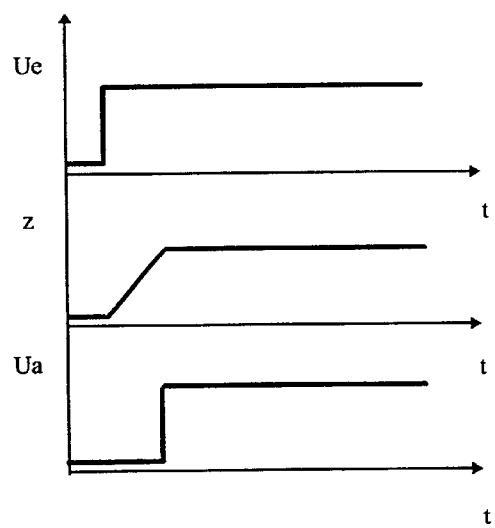
FIG. 3a is a graphical illustration of signal values in the valve of FIG. 3 for proper operation of the valve.

If a supply voltage Ue such as 10 volts is applied in known manner to coil 5, a magnetic field develops around coil 5 because of the current flowing through coil 5, and thereby armature 7 is displaced by a well-defined stroke z against the force of restoring spring 8. In the process, magnet 9 is shifted from its home position away from the Hall-effect sensor switch 4 by the same stroke z. Thus, the magnetic field of magnet 9 is shifted away from the Hall-effect switch 4, whereby the contacts of the Hall-effect switch 4 close and supply voltage Ue is conducted through the switch, so that an output voltage Ua approximately equal in amplitude and frequency to supply voltage Ue is present at the input of evaluation unit 2 (see FIG. 3a). By virtue of the comparison in evaluation unit 2, the completed valve stroke z is detected and the energized operating condition defining correct functioning of changeover valve 1 is confirmed by the two values. Short-circuiting ring 10 short circuits the magnetic field of magnet 9, thus ensuring that the magnetic field cannot cause any perturbations inside changeover valve 1. If energization of coil 5 is interrupted, armature 7 is returned to its home position by restoring spring 8, whereby magnet 9 is also shifted away from short-circuiting ring 10 and Hall-effect sensor switch 4 is exposed once again to the magnetic field of magnet 9 whereupon the Hall-effect sensor switch 4 reopens, and thereby an output voltage Ua close to 0 volts is present at the input of evaluation unit 2.

Figure 3B:
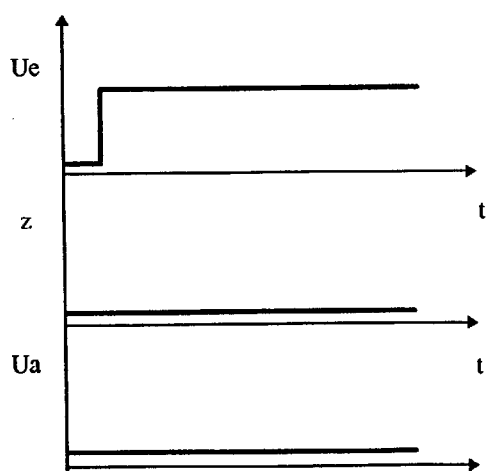
FIG. 3b is similar to FIG. 3a but shows the signals for malfunctioning of the valve.

If armature 7 is not displaced from its home position despite the presence of supply voltage Ue, the Hall-effect sensor switch 4 does not transmit voltage, since it continues to be exposed to the magnetic field of magnet 9. An output voltage Ua close to 0 volts is present at the input of evaluation unit 2. In the comparison of supply voltage Ue with output voltage Ua a voltage difference is detected to indicate malfunctioning of the changeover valve 1 (see FIG. 3b). This information can be fed to indicating device 3, such as a light, whereby a driver of a motor vehicle, is made aware that changeover valve 1 has malfunctioned and must be repaired.

It is self-evident that modifications are possible within the scope of the concept of the invention. For example, a plain bearing bush can be used instead of a magnetically conducting short-circuiting ring. It is also possible for indicating device 3 to indicate correct functioning of changeover valve 1 by a continuously glowing green lamp and to indicate malfunction by a red lamp. Furthermore, the information from evaluation unit 2 can be further processed electrically, for example in a monitoring computer.

Exact end-position queries can be achieved advantageously even for small strokes z with the described embodiment. The costs of such a functional check are kept low by the use of commercially available components, such as the Hall-effect sensor switch 4, the magnet 9 and the short-circuiting ring 10. Another advantage is that supply voltage Ue is picked up by the Hall-effect sensor switch 4 directly from coil 5 and relayed as output voltage Ua, whereby this corresponds to supply voltage Ue in amplitude and frequency and thus to the conventional actuation forms, such as pulse-width-modulated signals and the like.

Although the invention is disclosed with reference to particular embodiments thereof, it will become apparent to those skilled in the art that numerous modifications and variations can be made which will fall within the scope and spirit of the invention as defined by the attached claims.

What is claimed is:

1. Apparatus for monitoring operation of an electromagnetically actuated valve comprising a coil, a yoke including a casing supporting the coil, an armature operatively associated with the coil so as to be displaced upon energization of the coil to a changeover position, a spring acting on the armature to urge the armature to a home position when the coil is deenergized, an annular magnet on said armature, a Hall-effect sensor switch secured to said yoke in facing relation with said annular magnet, said Hall-effect sensor switch having open and closed positions and being in said open position when the armature is in said home position and being in said closed position when the armature is displaced through a determined stroke to said changeover position when the coil is energized, a short circuiting ring supported by said yoke adjacent to said Hall-effect sensor switch at a position to face said magnet when the armature is displaced through said determined stroke to said changeover position, and an evaluation unit connected to said Hall-effect sensor switch to indicate whether or not said armature has been displaced upon energization of said coil.

2. Apparatus as claimed in claim 1, wherein said Hall-effect sensor switch and said coil are jointly connected to receive a supply voltage.

3. Apparatus as claimed in claim 2, wherein said evaluation unit comprises a comparator having a first input receiving an output from said Hall-effect sensor switch and a second input receiving the supply voltage, said comparator comparing the output from the Hall-effect sensor switch and the supply voltage and producing an output signal when voltages at the first and second inputs are not equal.

4. Apparatus as claimed in claim 1, comprising a display device connected to said evaluation unit to indicate malfunction of the valve when the coil has been energized and the Hall-effect sensor switch remains open.

* * * * *